(12) United States Patent
Russo et al.

(10) Patent No.: US 7,399,735 B2
(45) Date of Patent: Jul. 15, 2008

(54) PERFLUOROPOLYETHER ADDITIVES

(75) Inventors: Antonio Russo, Milan (IT); Patrizia Maccone, Milan (IT)

(73) Assignee: Solvay Solexis S.p.A., Milan (IT)

( * ) Notice: Subject to any disclaimer, the term of this patent is extended or adjusted under 35 U.S.C. 154(b) by 835 days.

(21) Appl. No.: 10/849,168

(22) Filed: May 20, 2004

(65) Prior Publication Data

US 2004/0235685 A1   Nov. 25, 2004

(30) Foreign Application Priority Data

May 20, 2003   (IT) ............................ MI2003A0992

(51) Int. Cl.
*C10M 107/38* (2006.01)
*C10M 149/00* (2006.01)
*C07D 213/62* (2006.01)

(52) U.S. Cl. .................. 508/266; 508/182; 508/267; 546/261; 546/290

(58) Field of Classification Search ................ 508/266, 508/267
See application file for complete search history.

(56) References Cited

U.S. PATENT DOCUMENTS

| | | | |
|---|---|---|---|
| 3,214,478 A | 10/1965 | Milian | |
| 3,242,218 A | 3/1966 | Miller | |
| 3,665,041 A | 5/1972 | Sianesi et al. | |
| 3,715,378 A | 2/1973 | Sianesi et al. | |
| 4,523,039 A | 6/1985 | Lagow et al. | |
| 4,757,145 A * | 7/1988 | Caporiccio et al. | 428/835.8 |
| 5,190,681 A | 3/1993 | Strepparola et al. | |
| 5,965,496 A * | 10/1999 | Yamana et al. | 508/244 |
| 6,083,600 A | 7/2000 | Kasai et al. | |
| 6,828,284 B2 * | 12/2004 | Howell et al. | 508/182 |

FOREIGN PATENT DOCUMENTS

| | | |
|---|---|---|
| EP | 0 148 482 A2 | 12/1984 |
| EP | 1 354 932 A1 | 10/2003 |
| GB | 1226566 | 4/1968 |

* cited by examiner

Primary Examiner—Ellen M. McAvoy
(74) Attorney, Agent, or Firm—Arent Fox LLP

(57) ABSTRACT

Compounds formed of (per)fluoropolyether chains and end groups having a pyridine structure, with structural formula:

$$T_1\text{-}CW_1\text{—}O\text{—}R_f\text{—}CW_2\text{-}T_2 \qquad (I)$$

wherein
$T_1$, $T_2$, equal to or different from each other, have the following meanings:
F, $CF_3$, $C_2F_5$, $(C_2F_4)Cl$;
$CH_2\text{—}B\text{—}Y$, $CH(CF_3)O\text{—}Y$, wherein:
B=O, S;

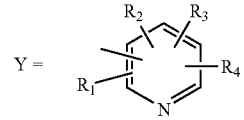

wherein $R_1$, $R_2$, $R_3$, $R_4$, equal to or different from each other, are H, F, $C_1$-$C_8$ linear or branched perfluoroalkyl, $NO_2$, CN;
with the proviso that at least one of the two end groups $T_1$, $T_2$ is $CH_2\text{—}B\text{—}Y$ or $CH(CF_3)O\text{—}Y$ as above defined;
$W_1$, $W_2$, equal to or different from each other, are —F, —$CF_3$;
Rf is a (per)fluoropolyoxyalkylene chain having a number average molecular weight from 400 to 10,000.

16 Claims, No Drawings

PERFLUOROPOLYETHER ADDITIVES

The present invention relates to stabilizing additives for lubricating oils and greases.

More specifically the invention relates to additives capable to stabilize oils and greases having a perfluoropolyether structure towards Lewis acids, the process for their preparation and to oil and grease compositions having a perfluoropolyether structure comprising said additives.

It is known in the prior art that perfluoropolyethers have very good properties of chemical, thermal stability and are therefore used in many applications as lubricating oils or greases or hydraulic fluids. Among lubricants having a perfluoropolyether structure, FOMBLIN® commercialized by Solvay Solexis can be mentioned.

Particularly critical applications are those wherein lubricants having a perfluoropolyether structure are in the presence of Lewis acids. It is known that Lewis acids, as for example aluminum, iron, titanium, vanadium oxides or fluorides and others are catalysts of perfluoropolyether degradations, causing the complete lubricant decomposition.

The applications wherein lubricants come into contact with Lewis acids are for example the magnetic disc lubrication or the metal part lubrication in thermo-oxidative environment. In the first case the Lewis acid is one of the disc constituents; in thermo-oxidative environment the Lewis acid is formed in the lubricant utilization conditions.

European patent application No. 03008436 in the name of the Applicant describes stabilizing additives not containing phosphor, with a (per)fluoropolyether structure and having aryl terminals containing —$NO_2$ groups. According to this patent application the additives are used to stabilize perfluoropolyether oils and greases in thermo-oxidative environment in the presence of metals. Tests carried out by the Applicant have shown that said additives have good performances in the presence of Lewis acids, however it would be desirable to further improve the fluid stability.

In U.S. Pat. No. 6,083,600 lubricants for magnetic discs comprising stabilizing compounds formed of chains constituted by repeating units —$(CF_2)_n$—O—, wherein n is from 1 to 4 and having as end groups at least one amine group of —$CH_2NRR'$ type, wherein R and R' are alkyl groups, are described. The synthesis of these amines requires the use of trifluoromethyl sulphonyl chloride. It is an expensive reactant and requires the use of particular operating conditions, since it must be used in anhydrous environment. From the industrial point of view said operating conditions make more complicated the synthesis process. Besides, tests carried out by the Applicant have shown that the compounds obtained according to this patent, used as additives of lubricants having a perfluoropolyether structure operating in the presence of Lewis acids, have good performances; however it would be desirable to further improve the fluid stability.

The need was felt to have available additives for lubricating fluids having a perfluoropolyether basis, operating in the presence of Lewis acids, having the following combination of properties:
- improved stabilizing properties in the presence of Lewis acids, even at high temperatures, in comparison with the (per)fluoropolyether additives of the prior art;
- simplified synthesis process.

The Applicant has surprisingly and unexpectedly found additives having the above combination of properties.

An object of the present invention are compounds usable as stabilizing additives of perfluoropolyether fluids operating in the presence of Lewis acids, said additives formed of (per)fluoropolyether chains and end groups having a pyridine structure, having the following structural formula:

$$T_1\text{-}CW_1\text{—}O\text{—}R_f\text{—}CW_2\text{-}T_2 \qquad (I)$$

wherein $T_1$, $T_2$, equal to or different from each other, have the following meanings:

F, $CF_3$, $C_2F_5$, $(C_2F_4)Cl$;

$CH_2$—B—Y, $CH(CF_3)O$—Y, wherein:

B=O, S;

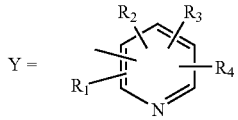

$Y =$ wherein $R_1, R_2, R_3, R_4$, equal to or different from each other are H, F, $C_1$-$C_8$ linear or branched perfluoroalkyl, $NO_2$, CN, preferably H and/or $C_1$-$C_8$ linear or branched perfluoroalkyl;

with the proviso that at least one of the two end groups $T_1$, $T_2$ is $CH_2$—B—Y or $CH(CF_3)O$—Y as above defined;

$W_1$, $W_2$, equal to or different from each other, are —F, —$CF_3$;

Rf is a (per)fluoropolyoxyalkylene chain formed of one or more repeating units, statistically distributed in the chain, having the following structure:

(CFXO), ($CF_2CF_2O$), ($CF_2CF_2CF_2O$), ($CF_2CF_2CF_2CF_2O$), ($CR_5R_6CF_2CF_2O$), ($CF(CF_3)CF_2O$), ($CF_2CF(CF_3)O$), wherein X=F, $CF_3$; $R_5$ and $R_6$, equal to or different from each other, are selected among H, Cl, perfluoroalkyl from 1 to 4 carbon atoms;

the number average molecular weight of $R_f$ being from 400 to 10,000, preferably from 800 to 5,000.

The (per)fluoropolyether chain $R_f$ is preferably selected from the following structures:

(A) —$(CF_2CF(CF_3)O)_a(CFXO)_b$— or —$(CF_2CF(CF_3)O)_a(CFXO)_b$—$CF_2(R'_f)CF_2$—O—$(CF_2CF(CF_3)O)_a(CFXO)_b$— wherein $R'_f$ is a fluoroalkylene group from 1 to 4 C atoms; X is F or $CF_3$; a and b are integers such that the number average molecular weight is within the above range; a/b is between 10 and 100;

(B) —$(CF_2CF_2O)_c(CF_2O)_d(CF_2(CF_2)_zO)_h$— wherein c, d and h are integers such that the number average molecular weight is within the above range; c/d is between 0.1 and 10; h/(c+d) is between 0 and 0.05, z is 2 or 3; h can also be equal to 0;

(C) —$(CF_2CF(CF_3)O)_e(CF_2CF_2O)_f(CFXO)_g$— wherein X is F or $CF_3$; e, f, g are integers such that the number average molecular weight is within the above range; e/(f+g) is between 0.1 and 10; f/g is between 2 and 10;

(D) —$(CF_2(CF_2)_zO)_s$— wherein s is an integer such as to give the above molecular weight, z has the already defined meaning;

(E) —$(CR_5R_6CF_2F_2O)_{j'}$— or —$(CR_5R_6CF_2CF_2O)_{p'}$—$R'_f$—O—$(CR_5R_6CF_2CF_2O)_{q'}$— wherein $R_5$ and $R_6$ are equal to or different from each other and selected among H, Cl or perfluoroalkyl from 1 to 4 C atoms; $R'_f$ is a fluoroalkylene group from 1 to 4 C atoms; j', p' and q' are integers such as to have a molecular weight as that above mentioned;

(F)—(CF(CF$_3$)CF$_2$O)$_{j'}$ or —(CF(CF$_3$)CF$_2$O)$_{j'}$—R'$_f$—O—(CF(CF$_3$)CF$_2$O)$_{j''}$— wherein R'$_f$ is a fluoroalkylene group from 1 to 4 C atoms; j" being an integer such as to give the above molecular weight.

Preferably the perfluoropolyether R$_f$ structures in the compounds of formula (I) are selected from the structures (A) and (B).

The preferred compounds of formula (I) are those wherein the (per)fluoropolyether chains are linked by an ether function to the carbon atom in alpha position with respect to the nitrogen atom of the pyridine ring Y.

The Applicant has surprisingly found that the compounds of the invention can be used as additives of perfluorinated lubricants, as, for example, perfluoropolyether-based oils or greases, supplying stabilizing performances, towards the Lewis acids, even at a high temperature, improved with respect to those obtained with known additives having a (per)fluoropolyether chain, as for example those described in U.S. Pat. No. 6,083,600.

It is for example well known that perfluoropolyethers having the structure B) are used in the lubrication even at temperatures close to 200° C. In the presence of Lewis acids said perfluoropolyethers decompose quite completely after 24 hours at the temperature of 250° C. It has been surprisingly found that the addition of the additives of the present invention allows to use said fluids even at higher temperatures, higher than 200° C., for example 220° C.-230° C. In fact tests carried out at 250° C. have shown that the oil remains stable for at least 24 hours since the weight loss is very low. The additives of the prior art, for example, with propylamine end groups show a decomposition which is about 1.5 times higher; for the additives with nitroaryl end groups the loss is about 2.5 times. The invention results are quite surprising and unexpected since there is no suggestion in the prior art that additives with a perfluoropolyether structure having pyridine end groups had improved stabilizing properties of the perfluoropolyether fluids.

The compounds object of the present invention are viscous transparent and odourless liquids.

A further object of the present invention are lubricating compositions comprising:

an oil or a grease having a perfluoropolyether structure;

from 0.05% to 10% by weight, preferably from 0.1% to 5% by weight on the total of the composition, of compounds of formula (I) of the present invention;

the composition being substantially formed of the oil or grease.

The perfluoropolyethers usable as oils or as a basis for the grease preparation are described hereinafter. Examples of perfluoropolyether oils are those having structures belonging to the following classes:

(1) E—O—(CF(CF$_3$)CF$_2$O)$_{m'}$(CFXO)$_{n'}$-E' wherein:

X is equal to F or CF$_3$;

E and E', equal to or different from each other, are selected among CF$_3$, C$_2$F$_5$ or C$_3$F$_7$;

m' and n' are integers such that the m'/n' ratio is in the range 20-1,000 and the product viscosity is in the range 10-4,000 cSt; the various units are statistically distributed along the chain.

These products can be obtained by perfluoropropene photooxidation as described in GB 1,104,432, and by subsequent conversion of the end groups as described in GB 1,226,566.

(2) C$_3$F$_7$O—(CF(CF$_3$)CF$_2$O)$_{o'}$-D wherein:

D is equal to —C$_2$F$_5$ or —C$_3$F$_7$;

o' is an integer such that the product viscosity is within the above range.

These products can be prepared by ionic oligomerization of the perfluoropropylenoxide and subsequent treatment with fluorine as described in U.S. Pat. No. 3,242,218.

(3) {C$_3$F$_7$O—(CF(CF$_3$)CF$_2$O)$_{p'}$—CF(CF$_3$)—}$_2$ wherein:

p' is an integer such that the compound viscosity is within the above range.

These products can be obtained by ionic telomerization of the perfluoropropylenoxide and subsequent photochemical dimerization as reported in U.S. Pat. No. 3,214,478.

(4) E-O—(CF(CF$_3$)CF$_2$O)$_{q'}$(C$_2$F$_4$O)$_{r'}$(CFX)$_{s'}$-E' wherein:

X is equal to F or CF$_3$;

E and E', equal to or different from each other, are as above;

q', r' and s' are integers and can also have the 0 value, and such that the product viscosity is within the above range.

These products are obtained by photooxidation of a mixture of C$_3$F$_6$ and C$_2$F$_4$ and subsequent treatment with fluorine as described in U.S. Pat. No. 3,665,041.

(5) E-O—(C$_2$F$_4$O)$_{t'}$(CF$_2$O)$_{u'}$-E' wherein:

E and E', equal to or different from each other, are as above;

t' and u' are integers such that the t'/u' ratio is in the range 0.1-5 and the product viscosity is within the above range.

These products are obtained by photooxidation of C$_2$F$_4$ as reported in U.S. Pat. No. 3,715,378 and subsequent treatment with fluorine as described in U.S. Pat. No. 3,665,041.

(6) E-O—(CF$_2$CF$_2$CF$_2$O)$_{v'}$—E' wherein:

E and E', equal to or different from each other, are as above;

v' is a number such that the product viscosity is within the above range.

These products are obtained as described in EP 148,482.

(7) D-O—(CF$_2$CF$_2$O)$_{z'}$-D' wherein:

D and D', equal to or different from each other, are selected between C$_2$F$_5$ or C$_3$F$_7$;

z' is an integer such that the product viscosity is within the above range.

These products can be obtained as reported in U.S. Pat. No. 4,523,039.

The perfluoropolyether of the classes from (1) to (7) are liquids having a very low vapour pressure value and generally have a viscosity measured at 20° C. from 30 to 100,000 cSt, preferably from 100 to 2,000 cSt.

The preferred perfluoropolyether oils are those of the classes (1), (4), (5) and are available on the market with the trademark FOMBLIN® sold by Solvay Solexis.

The invention formulations can also contain other additives commonly used in formulations of lubricants having a perfluoropolyether structure as for example anti-rust, antioxidant or anti-wear additives.

Furthermore, in the case of lubricating greases, the formulations contain, besides the perfluoropolyether oil belonging to one or more of the above mentioned classes, as essential component, a thickener, in the known amounts of the prior art, as for example PTFE, sodium terephthalamate, calcium or lithium soaps, polyurea, etc. Other additives generally contained in the lubricating grease compositions are the dispersants such as for example surfactants, in particular non ionic, and preferably having a perfluoropolyether or perfluoroalkyl structure; talc or inorganic fillers. Besides the lubricating grease compositions according to the present invention can also contain other additives commonly used in grease formulations, such for example anti-rust, anti-oxidant or anti-wear additives.

The amounts of said additives are those generally used for this kind of compositions.

The amounts of oil or grease in the invention composition are those commonly used in lubricating compositions based on oils or greases as above defined.

A further object of the present invention is a process to obtain the compounds of formula (I) comprising the following steps:
a) preparation of an alcoholate or thiolate by reaction of a compound having a (per)fluoropolyoxyalkylene structure of formula:

wherein:
$R_f$, $W_1$ and $W_2$ have the above meanings;
$T'_1$ and $T'_2$, equal to or different from each other, represent an end group selected from the following:
$CH_2OH$, $CH_2SH$, $CH(OH)CF_3$, F, $CF_3$, $C_2F_5$, $(C_2F_4)Cl$;
with the proviso that at least one of the two end groups $T'_1$ and/or $T'_2$ is equal to $CH_2OH$, $CH_2SH$ or $CH(OH)CF_3$;
with an organic or inorganic base, in organic solvent inert under the reaction conditions;
b) reaction of the alcoholate or thiolate obtained in step a) with a pyridine compound of formula

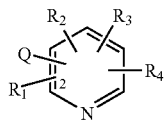

(III)

wherein $R_1$, $R_2$, $R_3$, $R_4$ have the above meaning, Q is halogen selected from Cl, Br, I,
wherein the ratio of the equivalents between the alcoholate or thiolate function of the (per)fluorinated chain and the pyridine compound(III) is from 1 to 0.5, preferably from 0.8 to 0.6, in an organic solvent inert under the reaction conditions, at a temperature in the range 20° C.-100° C., preferably 40° C.-80° C.;
c) isolation of the reaction product.

Steps a)+b) can be simultaneously carried out, preferably in the presence of a phase transfer agent; alternatively they can be carried out in sequence.

The phase transfer agent is preferably a phosphonium or a quaternary ammonium salt known in the prior art, for example tetrabutylammonium hydroxide, tetramethylammonium chloride.

When the steps a)+b) take place simultaneously, the organic solvent is preferably selected from hydrogenated solvents, as for example acetonitrile, chlorobenzene, toluene, xylene, or fluorinated or hydrofluorinated solvents, having boiling point in the range 20° C.-150° C., preferably 40° C.-100° C.

The ratio by weight between the solvent and the (per)fluorinated alcohol or thiol is preferably from 0.5 to 10, more preferably from 2 to 5.

The bases are preferably $K_2CO_3$ or solid $Na_2CO_3$, aqueous solutions of NaOH or KOH at a concentration from 20% to 60% w/w, preferably from 30% to 50% w/w.

The ratio between the base equivalents and the (per)fluorinated alcohol or thiol equivalents ranges from 2 to 10.

The equivalents of the phase transfer agent, when used, are in a ratio with the equivalents of the (per)fluorinated alcohol or thiol from 0.01 to 0.1.

The reaction times are function of the reaction temperature and generally comprised between 4 and 24 hours. For example, when the reaction temperature is 80° C. the reaction time is of about 6 hours.

When steps a)+b) are carried out in sequence, the compound of structure (II) is reacted in the first step with an organic or inorganic base, selected for example among potassium terbutylate, KOH, NaH.

The ratio between the base equivalents and those of the compound of structure (II) ranges from 1.1 to 2, preferably from 1.2 to 1.5; the reaction solvent is preferably selected from terbutyl alcohol, acetonitrile, diglyme, DMF.

In the second step of the process the obtained (per)fluoropolyether alcoholate or thiolate is reacted with a compound of formula (III) under the above conditions.

As said, the additives having a (per)fluoropolyether structure according to the present invention allow to obtain formulations of (per)fluoropolyether oils and greases having an improved stability to Lewis acids in comparison with the same formulations containing the same amount of (per)fluoropolyether additives of the prior art.

The present invention will be better illustrated by the following Examples, having a merely illustrative and not limitative purpose of the invention.

EXAMPLES

Stability Test to Lewis Acids for Oils

The determiantion of the stability of the oils to be tested to Lewis acids in the presence of the additives according to the present invention has been carried out as follows.

5 grams of the fluid to be tested, optionally containing the additive at the concentration indicated in the Examples, and 0.10 g of $AlF_3$ are introduced in a glass test tube (about 10 cc). The test tube is weighed and closed with a screw plug having a hole in the middle on which a 30 cm PTFE small pipe is fixed which conveys possible decomposition products in a NaOH solution (0,1 N) contained in a collection cylinder. The test tube is then heated to 250° C. for 24 hours. At the end the test tube is cooled and weighed. The test result is expressed in per cent weight loss of the starting fluid.

Stability Test to Lewis Acids for Greases 50 g of grease to be tested, optionally containing the additive at the concentration indicated in the Examples, are additived with 5% by weight of $AlF_3$ and deposited, by a stratifying knife, in a glass capsule having a diameter of 95 mm, so as to cover the whole exposed surface. The capsule is placed in a drier for 30', then weighed and placed in a stove at 250° C. After 4 hours the capsule is taken off from the oven and let cool in a drier. The capsule is then weighed again and it is evaluated the per cent weight loss with respect to the initial weight. The test result is therefore expressed in percent weight loss with respect to the initial weight.

Example 1

Preparation of the Derivative of Formula (IV)

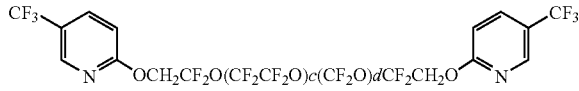

having a number average molecular weight=2388.

140 g of tert-butyl alcohol and 14 g (0.125 moles) of potassium terbutylate are introduced in a 1,000 ml glass reactor equipped with mechanical stirrer, thermometer and condenser.

Then 100 g (0.095 eq) of $HOCH_2CF_2O(CF_2CF_2O)_c(CF_2O)_dCF_2CH_2OH$ (EW=1049) wherein c/d=1 are introduced under stirring at room temperature. The reaction mixture is left under stirring at room temperature for about 30 minutes, then 17.3 g (0.095 moles) of 2-chloro-3-trifluoromethyl pyridine are fed into the reactor. The so obtained mixture is heated to 70° C. and kept under stirring for about 6 hours. After cooling 500 g of demineralized water are added. Then the phases are let separate and the heavy organic phase is recovered and washed two times with 500 g of demineralized water. The organic phase is then anydrified by stripping at 100° C. at a residual pressure of $10^{-2}$ mbar for about 4 hours, and successively filtered on PTFE 0.2 μm filter. 106 g of product are obtained wherein the conversion of alcoholic groups into ether groups is 93%. The IR and NMR ($^1H$, $^{19}F$ and $^{13}C$) analyses confirm the structure of the above indicated product (IV).

Example 2

Preparation of the Derivative (V) Having Pyridine End Groups

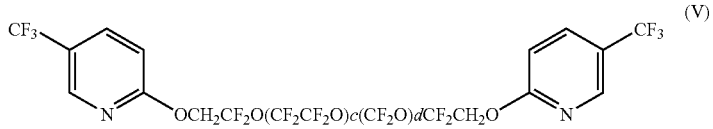

having number average molecular weight 4202.

Example 1 is repeated but using the following reactants in the indicated amounts: tert-butyl alcohol 140 g; potassium terbutylate 7.5 g (0.067 moles);

$HOCH_2CF_2O(CF_2CF2O)_c(CF_2O)_dCF_2CH_2OH$ (EW=1956) wherein c/d=0.8, 100 g (0.051 eq); 2-chloro-3-trifluoromethyl pyridine 10.21 g (0.056 moles).

104 g of product are obtained wherein the conversion of alcohol groups into ether groups is 85%. The IR and NMR ($^1H$, $^{19}F$ e $^{13}C$) analyses confirm the structure of the above indicated product.

Example 3

The stability test to Lewis acids for oils is carried out, by using 5 g of Fomblin® Z25 oil, having number average molecular weight 10,000, additived with 0.05 g of the compound (IV) of the Example 1.

After 24 hours a loss by weight of the fluid equal to 0.18% is determined. The Example is summarized in Table 1.

Example 4

The stability test to Lewis acids for oils is carried out by using 5 g of Fomblin® Z25 oil, having number average molecular weight of 10,000, additived with 0.05 g of the compound (V) of the Example 2.

After 24 hours a fluid weight loss equal to 0.16% is determined. The Example is summarized in Table 1.

Example 5 (Comparative)

Example 3 is repeated, but in absence of the invention additive.

The fluid results completely decomposed after 5 hours from the beginning of the test. The Example is summarized in Table 1.

Example 6

Example 3 is repeated, but by using an oil having number average molecular weight 13.000 (Fomblin® Z60).

After 24 hours a weight loss of the fluid equal to 0.16% is determined. The Example is summarized in Table 1.

Example 7 (Comparative)

Example 6 is repeated without the invention additive.
After 24 hours a weight loss of the fluid equal to 52.2% is determined. The Example is summarized in Table 1.

Example 8 (Comparative)

Example 6 is repeated, but by using 0.05 g of the following additive of formula (VI) described in U.S. Pat. No. 6,083,600:

$(CH_3CH_2CH_2)_2$—N—$CH_2CF_2O$ $(CF_2CF_2O)_c(CF_2O)_dCF_2CH_2$—N—$(CH_2CH_2CH_3)_2$ having number average molecular weight 2000.

24 hours elapsed, a weight loss of the fluid equal to 0.25% is determined. The Example is summarized in Table 1.

Example 9 (Comparative)

Example 1 is repeated but by using 1% of the stabilizing additive having the following formula (VII):

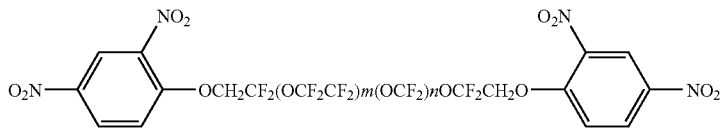

wherein the number average molecular weight of the (per)fluoropolyether chain is 1966 and m/n=1.2, prepared according to the Example 1 of European patent application No. 03008436.

24 hours elapsed, a weight loss of the fluid equal to 0.42% is determined. The Example is summarized in Table 1.

Example 10

A grease is prepared by mixing 70% by weight of Fomblin® M30 having molecular weight 9,800, with 30% by weight of PTFE. The grease is additived with 1% by weight of the additive prepared according to the Example 2 and then subjected to the stability test to Lewis acids for greases. At the end of the test a per cent weight loss of 1.6% is determined. The Example is summarized in Table 1.

Example 11 (Comparative)

Example 10 is repeated, but in absence of the invention additive. At the end of the test, a per cent weight loss of 66% is determined. The Example is summarized in Table 1.

TABLE 1

| Ex. | Oil/grease | Additive | Loss by weight % |
|---|---|---|---|
| 3 | Fomblin® Z 25 (M.W. 10,000) | (IV) (ex. 1) | 0.18 |
| 4 | Fomblin® Z 25 (M.W. 10,000) | (V) (ex. 2) | 0.16 |
| 5 comp | Fomblin® Z 25 (M.W. 10,000) | — | decomp after 5 h |
| 6 | Fomblin® Z 60 (M.W. 13,000) | (IV) (ex. 1) | 0.16 |
| 7 comp | Fomblin® Z 60 (M.W. 13,000) | — | 52.2 |
| 8 comp | Fomblin® Z 60 (M.W. 13,000) | (VI) (U.S. Pat. No. 6,083,600) | 0.25 |
| 9 comp | Fomblin® Z 25 (M.W. 10,000) | (VIII) (EPA 03008436) | 0.42 |
| 10 | 70% Fomblin® M 30 + 30% PTFE (grease) | (V) (ex. 2) | 1.6 |
| 11 comp | 70% Fomblin® M 30 + 30% PTFE (grease) | — | 66 |

Stability tests to Lewis acids for oils and greases carried out on the compositions used in the Example 3-11. For each Example it is indicated the kind of oil or grease, the used additive (concentration 1% by weight) and the text result expressed in per cent by weight loss.

The invention claimed is:
1. Compounds formed of (per)fluoropolyether chains and end groups having a pyridine structure, having the following structural formula:

$$T_1\text{-}CW_1\text{—}O\text{—}R_f\text{—}CW_2\text{-}T_2 \quad (I)$$

wherein
$T_1$, $T_2$, equal to or different from each other, have the following meanings:
F, $CF_3$, $C_2F_5$, $(C_2F_4)$ Cl;
$CH_2$—B—Y, $CH(CF_3)O$—Y, wherein:
B=O, S;

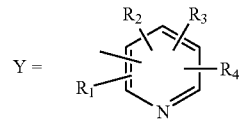

wherein $R_1$, $R_2$, $R_3$, $R_4$, equal to or different from each other, are H, F, $C_1$-$C_8$ linear or branched perfluoroalkyl, $NO_2$, ON, preferably H and/or $C_1$-$C_8$ linear or branched perfluoroalkyl;
with the proviso that at least one of the two end groups $T_1$, $T_2$ is $CH_2$—B—Y or CH $(CF_3)O$—Y as above defined;
$W_1$, $W_2$, equal to or different from each other, are —F, —$CF_3$;
Rf is a (per)fluoropolyoxyalkylene chain formed of one or more repeating units, statistically distributed in the chain, having the following structure: (CFXO), ($CF_2CF_2O$), ($CF_2CF_2CF_2O$), ($CF_2CF_2CF_2CF_2O$), ($CR_5R_6CF_2CF_2O$), ($CF(CF_3)CF_2O$), ($CF_2CF(CF_3)O$),
wherein X=F, $CF_3$; $R_5$ and $R_6$, equal to or different from each other, are selected from H, Cl, perfluoroalkyl from 1 to 4 carbon atoms;
the number average molecular weight of $R_f$ being from 400 to 10,000, preferably from 800 to 5,000.
2. Compounds according to claim 1, wherein the (per)fluoropolyether chain $R_f$ is selected from the following structures:
(A) —$(CF_2CF(CF_3)O)_a(CFXO)_b$— or —$(CF_2CF(CF_3)O)_a(CFXO)_b$—$CF_2(R'_f)CF_2$—O—$(CF_2CF(CF_3)O)_a(CFXO)_b$
wherein $R'_f$ is a fluoroalkylene group from 1 to 4 C atoms; X is F or $CF_3$; a and b are integers such that the number average molecular weight is within the above range; a/b is between 10 and 100;
(B) —$(CF_2CF_2O)_c(CF_2O)_d(CF_2(CF_2)_zO)_h$—
wherein c, d and h are integers such that the number average molecular weight is within the above range; c/d is between 0.1 and 10; h/(c+d) is between 0 and 0.05, z is 2 or 3; h can also be equal to 0;
(C) —$(CF_2CF(CF_3)O)_e(CF_2CF_2O)_f(CFXO)_g$—
wherein X is F or CF3; e, f, g are integers such that the number average molecular weight is within the above range; e/(f+g) is between 0.1 and 10;

f/g is between 2 and 10;

(D) —$(CF_2(CF_2)_zO)_s$— wherein s is an integer such as to give the above molecular weight, z has the already defined meaning;

(E) —$(CR_5R_6CF_2CF_2O)_{j'}$— or —$(CR_5R_6CF_2CF_2O)_{p'}$—$R'_f$—O—$(CR_5R_6CF_2CF_2O)_{q'}$— wherein $R_5$ and $R_6$ are equal to or different from each other and selected from H, Cl or perfluoroalkyl from 1 to 4 C atoms: $R'_f$ is a fluoroalkylene group from 1 to 4 C atoms; j', p' and q' are integers such as to have a molecular weight as that above indicated;

(F) —$(CF(CF_3)CF_2O)_{j''}$ or —$(CF(CF_3)CF_2O)_{j''}$—$R'_f$—O—$(CF(CF_3)CF_2O)_{j'''}$— wherein $R'_f$ is a fluoroalkylene group from 1 to 4 C atoms; j'' being an integer such as to give the above molecular weight.

3. Compounds according to claim 2, wherein the perfluoropolyether structures $R_f$ in the compounds of formula (I) are selected from the structures (A) and (B).

4. Compounds according to claim 1, wherein the (per)fluoropolyether chains are linked by an ether function to the carbon atom in alpha position with respect to the nitrogen atom of the pyridine ring Y.

5. Lubricating compositions comprising:

an oil or a grease having a perfluoropolyether structure;

from 0.05% to 10% by weight, preferably from 0.1% to 5% by weight on the total of the composition, of compounds of claim 1.

6. Compositions according to claim 5, wherein the perfluoropolyether oils have structures belonging to the following classes:

(1) E-O—$(CF(CF_3)CF_2O)_{m'}(Cl.XO)_{n'}$—E' wherein:

X is equal to F or $CF_3$;

E and E', equal to or different from each other, are selected from $CF_3$, $C_2F_5$ or $C_3F_7$;

m' and n' are integers such that the m'/n' ratio is between 20 and 1,000 and the product viscosity is between 10 and 4,000 cSt; the various units are statistically distributed along the chain;

(2) $C_3F_7O$—$(CF(CF_3)CF_2O)_{o'}$—D)

wherein:

D is equal to —$C_2F_5$ or —$C_3F_7$;

o' is an integer such that the product viscosity is within the above range;

(3) $\{C_3F_7O$—$(CF(CF_3)CF_2O)_{p'}$—$CF(CF_3)$—$\}_2$ wherein:

p' is an integer such that the compound viscosity is within the above range;

(4) E-O—$(CF(CF_3)CF_2O)_{q'}(C_2F_4O)_{r'}(CFX)_{s'}$—E' wherein:

X is equal to F or $CF_3$;

E and E', equal to or different from each other, are as above;

q', r' and s' are integers and can also have the 0 value, and such that the product viscosity is within the above range;

(5) E-O—$(C_2F_4O)_{t'}(CF_2O)_{u'}$—E, wherein:

E and E', equal to or different from each other, are as above;

t' and u' are integers such that the t'/u' ratio is between 0.1 and 5 and the product viscosity is within the above range;

(6) E-O—$(CF_2CF_2CF_2O)_{v'}$—E' wherein:

E and E', equal to or different from each other, are as above;

v' is a number such that the product viscosity is within the above range;

(7) D-O—$(CF_2CF_2O)_{z'}$—D' wherein:

D and D', equal to or different from each other, are selected between $C_2F_5$ or $C_3F_7$;

z' is an integer such that the product viscosity is within the above range; the perfluoropolyether structures of the classes from (1) to (7) having a viscosity determined at 20° C. from 30 to 100,000 cSt, preferably from 100 to 2,000 cSt.

7. Compositions according to claim 6, wherein the perfluoropolyether oils are those of the classes (1), (4), (5).

8. Compositions according to claim 5, comprising anti-rust, anti-oxidant or anti-wear additives.

9. Compositions according to claim 5, wherein the grease contains the perfluoropolyether oil and thickeners selected from PTFE, sodium terephthalamate, calcium or lithium soaps, polyurea.

10. Compositions according to claim 9 containing additives selected from dispersing agents preferably surfactants, in particular non ionic, having a perfluoropolyether or perfluoroalkyl structure; talc or inorganic fillers, anti-rust, anti-oxidant or anti-wear additives.

11. A process to obtain the compounds of claim 1, comprising the following steps:

a) formation of an alcoholate or thiolate, by reaction of a compound having a (per)fluoropolyoxyalkylene structure of formula:

$$T'_1-CW_1-O-R_f CW_2-T'_2 \qquad (II)$$

wherein:

$R_f$, $W_1$ and $W_2$ have the above meanings;

$T'_1$ and $T'_2$, equal to or different from each other, represent and end group selected from the following: $CH_2OH$, $CH_2SH$, $CH(OH)CF_3$, F, $CF_3$, $C_2F_5$, $(C_2F_4)Cl$;

with the proviso that at least one of the two end groups $T'_1$ and/or $T'_2$ is equal to $CH_2OH$, $CH_2SH$ or $CH(OH)CF_3$;

with an organic or inorganic base, in organic solvent inert under the reaction conditions;

b) reaction of the alcoholate or thiolate obtained in step a) with a pyridine compound of formula (III)

wherein $R_1$, $R_2$, $R_3$, $R_4$ have the above meaning, Q is halogen selected from Cl, Br, I, wherein the ratio of the equivalents between the alcoholate or thiolate function of the (per)fluorinated chain and the pyridine compound (III) is from 1 to 0.5, preferably from 0.8 to 0.6, in an organic solvent inert under the reaction conditions, at a temperature in the range 20° C.-100° C., preferably 40° C.-80° C.;

c) product isolation from the reaction mass.

12. A process according to claim 11, wherein the steps a)+b) can be simultaneously carried out, preferably in the presence of a phase transfer agent; or they can be carried out in sequence.

13. A process according to claim 12, wherein the phase transfer agent is a phosphonium or a quaternary ammonium salt, preferably selected between tetrabutylammonium hydroxide or tetramethylammonium chloride.

14. A process according to claim 11, wherein, when steps a) and b) are simultaneously carried out, the ratio by weight between the solvent and the (per)fluorinated alcohol or thiol is from 0.5 to 10, preferably from 2 to 5; the ratio between the base equivalents and the (per)fluorinated alcohol or thiol equivalents ranges from 2 to 10; the equivalents of the phase transfer agent, when used, are in a ratio with the equivalents of the (per)fluorinated alcohol or thiol from 0.01 to 0.1.

15. A process according to claim 11, wherein, when steps a) and b) are carried out in sequence, the ratio between the base equivalents and those of the compound of structure (II) ranges from 1.1 to 2, preferably from 1.2 to 1.5.

16. A method for stabilizing oils and greases having a perfluoropolyether structure operating in the presence of Lewis acids, at temperatures higher than 200° C., comprising the step of adding the compounds as defined in claim 1.

* * * * *